(12) United States Patent
Glebov et al.

(10) Patent No.: US 7,949,217 B2
(45) Date of Patent: May 24, 2011

(54) SELECTIVELY ENHANCING ANGULAR BEAM DEFLECTION

(75) Inventors: Alexei L. Glebov, San Mateo, CA (US); Vadim I. Smirnov, Orlando, FL (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/113,506

(22) Filed: May 1, 2008

(65) Prior Publication Data

US 2009/0274409 A1 Nov. 5, 2009

(51) Int. Cl.
*G02B 6/26* (2006.01)
(52) U.S. Cl. .................................. 385/47; 385/16
(58) Field of Classification Search .................. 385/4, 8, 385/10, 15, 16, 17, 18
See application file for complete search history.

(56) References Cited

U.S. PATENT DOCUMENTS

| | | | | |
|---|---|---|---|---|
| 4,045,124 A | * | 8/1977 | Pollack et al. | 349/201 |
| 4,435,041 A | * | 3/1984 | Torok et al. | 359/573 |
| 4,737,946 A | * | 4/1988 | Yamashita et al. | 369/44.12 |
| 4,856,869 A | * | 8/1989 | Sakata et al. | 349/201 |
| 4,902,088 A | * | 2/1990 | Jain et al. | 385/8 |
| 5,070,488 A | * | 12/1991 | Fukushima et al. | 369/44.12 |
| 5,204,516 A | * | 4/1993 | Opheij | 250/201.5 |
| 5,276,745 A | * | 1/1994 | Revelli, Jr. | 385/14 |
| 6,072,607 A | * | 6/2000 | Tajiri et al. | 359/15 |
| 6,711,315 B1 | * | 3/2004 | Joseph et al. | 385/17 |
| 6,853,773 B2 | * | 2/2005 | Lin | 385/39 |
| 7,072,537 B1 | * | 7/2006 | Shiraishi | 385/16 |
| 7,256,915 B2 | * | 8/2007 | Sutherland et al. | 359/34 |
| 7,324,286 B1 | * | 1/2008 | Glebov et al. | 359/652 |
| 7,327,472 B2 | * | 2/2008 | Riza et al. | 356/519 |
| 7,522,788 B2 | * | 4/2009 | Akahoshi et al. | 385/14 |
| 2002/0045104 A1 | * | 4/2002 | Efimov et al. | 430/2 |
| 2002/0114556 A1 | * | 8/2002 | Kato et al. | 385/16 |
| 2002/0191889 A1 | * | 12/2002 | Lucero | 385/16 |
| 2002/0191894 A1 | * | 12/2002 | Culver et al. | 385/16 |
| 2003/0035614 A1 | * | 2/2003 | Glebov et al. | 385/21 |
| 2003/0035632 A1 | * | 2/2003 | Glebov et al. | 385/43 |
| 2003/0059148 A1 | * | 3/2003 | Nishizawa et al. | 385/8 |
| 2003/0202732 A1 | * | 10/2003 | Glebov et al. | 385/16 |
| 2003/0206675 A1 | * | 11/2003 | Glebov et al. | 385/8 |
| 2004/0013342 A1 | * | 1/2004 | Lucero | 385/16 |
| 2004/0028316 A1 | * | 2/2004 | Yokouchi | 385/16 |
| 2004/0105621 A1 | * | 6/2004 | Leu et al. | 385/37 |
| 2004/0105622 A1 | * | 6/2004 | Leu et al. | 385/37 |
| 2005/0084196 A1 | * | 4/2005 | Aoki | 385/8 |
| 2005/0117195 A1 | * | 6/2005 | Glebov et al. | 359/290 |
| 2005/0157983 A1 | * | 7/2005 | Aoki et al. | 385/40 |
| 2005/0163412 A1 | * | 7/2005 | Glebov et al. | 385/4 |
| 2005/0169573 A1 | * | 8/2005 | Yokouchi et al. | 385/22 |

(Continued)

FOREIGN PATENT DOCUMENTS

JP 2000241836 A * 9/2000

*Primary Examiner* — Charlie Peng
*Assistant Examiner* — Peter Radkowski
(74) *Attorney, Agent, or Firm* — Baker Botts L.L.P.

(57) ABSTRACT

According to one embodiment, an apparatus for deflecting light beams comprises an input deflector and one or more Bragg gratings. The input deflector receives light beams from input channels, and deflects each light beam to an initial deflection angle. A Bragg grating deflects at least one light beam from the initial deflection angle to an increased deflection angle, where the increased deflection angle is at least closer to an output channel than the initial deflection angle.

20 Claims, 2 Drawing Sheets

U.S. PATENT DOCUMENTS

| | | |
|---|---|---|
| 2005/0207466 A1* | 9/2005 | Glebov et al. ............... 372/92 |
| 2005/0213886 A1* | 9/2005 | Balakrishnan et al. ....... 385/46 |
| 2005/0265657 A1* | 12/2005 | Volodin et al. .............. 385/37 |
| 2006/0008199 A1* | 1/2006 | Glebov et al. ............... 385/15 |
| 2006/0017932 A1* | 1/2006 | Riza et al. .................. 356/484 |
| 2006/0082885 A1* | 4/2006 | Glebov et al. ............... 359/619 |
| 2006/0088240 A1* | 4/2006 | Aoki et al. .................. 385/9 |
| 2008/0008413 A1* | 1/2008 | Anderson et al. ............ 385/8 |
| 2008/0008414 A1* | 1/2008 | Anderson et al. ............ 385/8 |
| 2008/0080585 A1* | 4/2008 | Glebov et al. ............... 372/102 |
| 2008/0166086 A1* | 7/2008 | Akahoshi et al. ............ 385/16 |
| 2008/0192803 A1* | 8/2008 | Riza et al. .................. 374/161 |
| 2008/0297808 A1* | 12/2008 | Riza et al. .................. 356/503 |
| 2010/0128284 A1* | 5/2010 | Riza et al. .................. 356/519 |

* cited by examiner

US 7,949,217 B2

SELECTIVELY ENHANCING ANGULAR BEAM DEFLECTION

TECHNICAL FIELD

This invention relates generally to the field of light beam deflection and more specifically to selectively enhancing angular beam deflection.

BACKGROUND

Electro-optic (EO) deflector switches deflect light beams. An electro-optic deflector switch may have an electro-optic material patterned with prism-shaped electrodes. Voltage applied to the electrodes causes the material to deflect light beams. Electro-optic material, however, may have a low electro-optic coefficient, which yields low deflection efficiency. Additional voltage may be required in order to compensate for the low deflection efficiency.

SUMMARY OF THE DISCLOSURE

In accordance with the present invention, disadvantages and problems associated with previous techniques for deflecting light beams may be reduced or eliminated.

According to one embodiment of the present invention, an apparatus for deflecting light beams comprises an input deflector and one or more Bragg gratings. The input deflector receives light beams from input channels, and deflects each light beam to an initial deflection angle. A Bragg grating, such as a volume Bragg grating, deflects at least one light beam from the initial deflection angle to an increased deflection angle, where the increased deflection angle is at least closer to an output channel than the initial deflection angle.

Certain embodiments of the invention may provide one or more technical advantages. A technical advantage of one embodiment may be that a deflector switch has one or more Bragg gratings that increase the deflection angle of a light beam. A deflector of the deflector switch deflects a light beam at an initial deflection angle, and a Bragg grating further deflects the light beam to an increased deflection angle.

Another technical advantage of one embodiment may be that the deflector switch has Bragg gratings that react to different light beams. One Bragg grating deflects light beams arriving at a particular incident angle, while another Bragg grating deflects light beams arriving at a different incident angle.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5B of the drawings, like numerals being used for like and corresponding parts of the various drawings.

Figure 1:
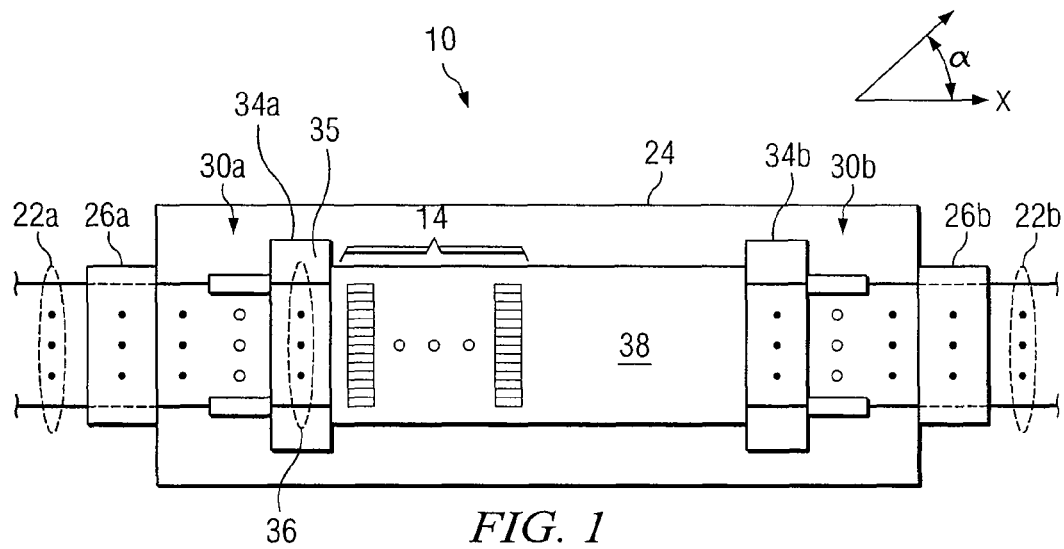
FIG. 1 illustrates one embodiment of a deflector switch apparatus that deflects light beams.

FIG. 1 illustrates one embodiment of a deflector switch apparatus 10 that deflects light beams. In the embodiment, switch apparatus 10 has one or more Bragg gratings 14 that increase the deflection angle of a light beam. Switch apparatus 10 may have Bragg gratings 14 that deflect light beams of different incident angles.

In one embodiment, switch apparatus 10 deflects light beams that operate as optical signals in an optical network, such as an optical burst transport network. The optical signals can communicate information such as voice, data, audio, video, multimedia, and/or other information, and may have a frequency of approximately 600 to 2000 nanometers, such as 850 to 1550 nanometers. Switch apparatus 10 may have a switching times of less than 1 second, such as less than 50, 25, 10, or 5 nanoseconds.

Transmission of a light beam between a first entity and a second entity refers to transmission of the light beam from the first entity to the second entity and/or transmission of the light beam from the second entity to the first entity. Entities are optically coupled if a light beam can be transmitted between the entities.

In the illustrated embodiment, switch apparatus 10 receives light beams from one or more input channels 22a, deflects the light beams, and sends the light beams to one or more output channels 22b. A light beam from a particular input channel 22a is deflected to send the beam to a target output channel 22b. Deflecting a light beam refers to changing the propagation direction of the light beam. In one embodiment, switch apparatus 10 can deflect a light beam at an angle $\alpha$ with respect to direction x. Angle $\alpha$ may have any suitable value, for example, $0 \leq \alpha \leq 1°$, $2°$, $5°$, $10°$, or $45°$, where $\alpha=0$ represents a light beam that is not deflected.

In one embodiment, input channels 22a transmit light beams to switch apparatus 10. A channel 22 (22a and/or 22b) may comprise an optical fiber. Switch apparatus 10 includes a substrate 24, an input fiber array 26a, one or more input microlenses 30a, an input deflector 34a, a waveguide 38, an output deflector 34b, one or more output microlenses 30b, and an output fiber array 26b. Waveguide 38 includes one or more Bragg gratings 14. Fiber arrays 26 (26a and/or 26b), microlenses 30 (30a and/or 30b), deflectors 34 (34a and/or 34b), and waveguide 38 may be aligned in direction x. In addition, an air gap may be present between components. For example, there may be air gaps of approximately 5 to 10 μm between microlenses 30, deflectors 34, and gratings 14. In one embodiment of operation, a light beam travels through input fiber array 26a, input microlenses 30a, input deflector 34a, Bragg gratings 14, waveguide 38, output deflector 34b, output microlenses 30b, and output fiber array 26b.

In the illustrated embodiment, substrate 24 supports other components. Substrate 24 may comprise any suitable material, for example, silicon. Input fiber array 26a transmits light beams from input channels 22a to microlenses 30a. A fiber array 26 includes one or more optical fibers, where each fiber is optically coupled to a channel 22.

Input microlenses 30a collimate light beams and transmit the light beams to input deflector 34a. A microlens 30 optically couples an optical fiber of a fiber array 26 to a waveguide of a deflector 34. Microlenses 30 may comprise as a planar silica waveguide microlens array fabricated according to a silica-on-silica planar technique. Microlenses 30 may be formed on a silica or silicon substrate by deposition and ion etching of lower cladding, core, and upper cladding silica layers. Microlenses 30 may also be formed from other optical materials such as optical polymers.

Input deflector 34a deflects a light beam to an initial deflection angle α. In one embodiment, a deflector 34 represents an electro-optic deflector, such as an electro-optic thin film or bulk deflector. An electro-optic deflector 34 comprises an electro-optic material 35 and prism electrodes 36. Examples of electro-optic materials include epitaxial films (such as lead zirconate titanate (PZT), lead lanthanum zirconium titanate (PLZT), and/or lithium niobate ($LiNbO_3$) epitaxial films), ion-sliced lithium niobate films, polymer electro-optic films, and/or other suitable material.

Prism electrodes 36 may be metal electrodes. A pair of electrodes 36 are formed at the surface of the material such that the material is disposed between the electrodes 36. When a voltage is applied to the electrodes 36, the refractive index of the material changes, and the material operates as a prism that deflects light beams. The deflection angle may be changed by changing the applied voltage or by applying voltage to different electrodes 36. Substrate 24 may be conductive and operate as a blanket counter electrode.

Slab waveguide 38 transmits light beams from input deflector 34a to output deflector 34b. Slab waveguide 38 may be formed from optical materials such as optical polymers, and may comprise lower cladding, core, and upper cladding layers. The core and cladding layers have different refractive indices that allow for transmission of light beams through the core layer. The core and cladding layers may have any suitable thickness, for example, approximately 3 μm, 2 μm, and 5 μm for lower cladding, core, and upper cladding layers, respectively.

Bragg gratings 14 may be integrated in slab waveguide 38 or disposed between input deflector 34a and slab waveguide 38. A Bragg grating 14, such as a volume Bragg grating, deflects a light beam from an initial deflection angle to an increased deflection angle. The increased deflection angle may bring the light beam closer to or actually to the target output channel 22b deflection angle. The increased deflection angle may have any suitable value, for example, greater than 2, 5, or 10 times the initial deflection angle.

A Bragg grating 14 has incident conditions that select the light beams that Bragg grating 14 deflects. Light beams that do not satisfy the incident conditions pass through without being deflected by grating 14. In one embodiment, incident conditions include the incident angle of light beams that Bragg grating 14 deflects. Accordingly, different Bragg gratings 14 can be used to deflect light beams with different incident angles. For example, a first Bragg grating 14 deflects a light beam arriving at one incident angle to a particular increased deflection angle, while a second Bragg grating 14 deflects another light beam arriving at a different incident angle to a different increased angle.

In another embodiment, incident conditions include the wavelengths of light beams that Bragg grating 14 deflects. Accordingly, different Bragg gratings 14 can be used to deflect light beams with different wavelengths. This type of Bragg grating 14 may be used in Wavelength Division Multiplexing (WDM) systems. Bragg grating 14 is described in more detail with reference to FIGS. 5A and 5B.

A Bragg grating 14 with specific grating parameters may be selected to yield particular incident conditions and other features, such as output angle, angle amplification strength, and angular and spectral sensitivities. Grating parameters include contrast δn, spatial frequency f, and grating thickness t. For example, the angular selectivity is approximated by $\Delta\Theta_{FWHM}$~$(ft)^{-1}$. Particular values for grating thickness t or spatial frequency f may yield angular selectivity of 0.01 to several degrees. Similarly, particular values may yield spectral selectivity of 0.1 to 100 nanometers (nm), and angle amplification strength of a few to hundreds of times.

Output deflector 34b deflects light beams to output microlenses 30b. Output deflector 34b may deflect the light beam at a reverse angle that is opposite of the increased deflection angle in order to direct the light beam towards a target output channel 22b in direction x. Output microlenses 30b focus light beams towards output fiber array 26b, which transmits the beams to output channels 22b.

Modifications, additions, or omissions may be made to the method without departing from the scope of the invention. The method may include more, fewer, or other steps. Additionally, steps may be performed in any suitable order.

Modifications, additions, or omissions may be made to apparatus 10 without departing from the scope of the invention. The components of apparatus 10 may be integrated or separated. Moreover, the operations of apparatus 10 may be performed by more, fewer, or other components. As used in this document, "each" refers to each member of a set or each member of a subset of a set.

Figure 2:
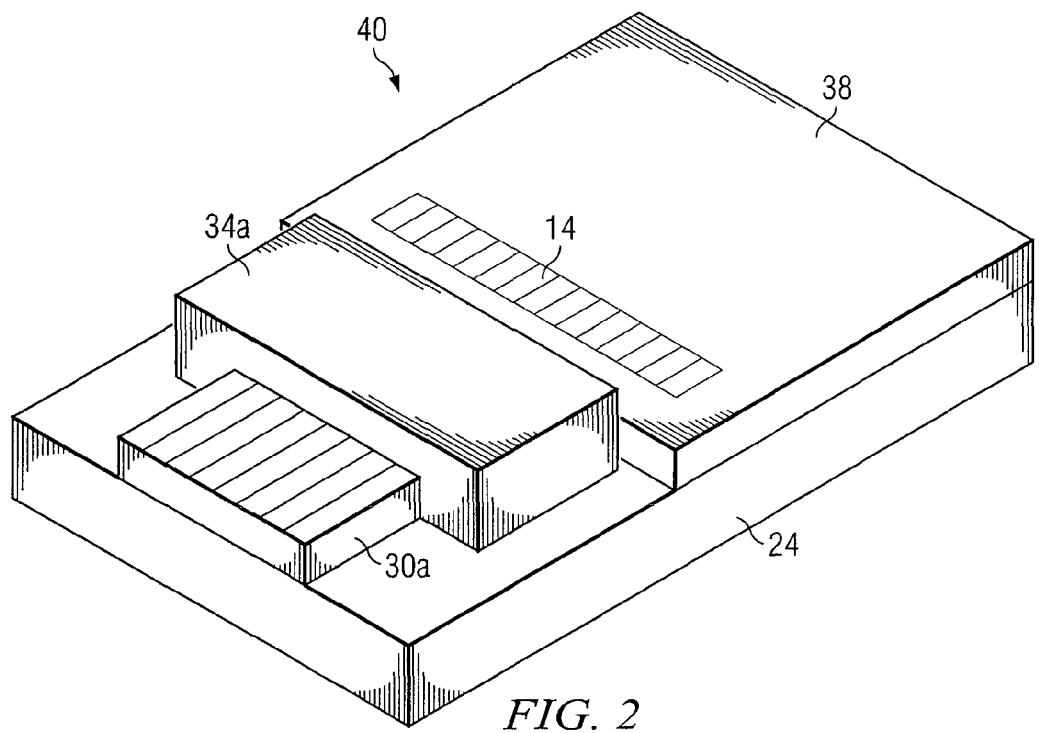
FIG. 2 illustrates one embodiment of a portion of the switch apparatus of FIG. 1.

FIG. 2 illustrates one embodiment of a portion 40 of switch apparatus 10 of FIG. 1. Portion 40 includes input microlenses 30a, input deflector 34a, and slab waveguide 38 disposed outwardly from substrate 24. Grating 14 is integrated into slab waveguide 38. Input fiber array 26a, input deflector 34a, waveguide layer 38, and grating 14 are optically coupled.

Figure 3:
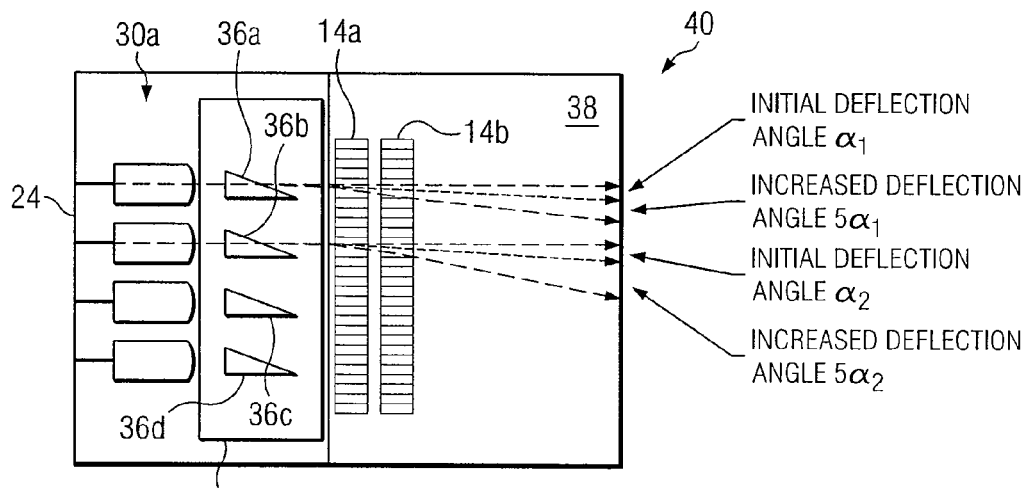
FIG. 3 illustrates another embodiment of a portion the switch apparatus of FIG. 1.

FIG. 3 illustrates another embodiment of a portion 40 of switch apparatus 10 of FIG. 1 that has Bragg gratings 14a and 14b that deflect light beams of different incident angles.

In the illustrated embodiment, portion 40 includes substrate 24, input microlenses 30a, input deflector 34a, slab waveguide 38, and Bragg gratings 14a and 14b. Deflector 34a includes prism electrodes 36a through 36d. Prism electrode 32a deflects a light beam at an initial deflection angle of $α_1$, and prism electrode 36b deflects a light beam at an initial deflection angle of $α_2$. Grating 14a is selective to angle $α_1$ and transparent to angle $α_2$, and grating 14b is selective to angle $α_2$ and transparent to angle $α_1$. Grating 14a deflects the light beam arriving at angle $α_1$, and grating 14b deflects the light beam arriving at angle $α_2$. Gratings 14 deflect light beams to yield an increased deflection angle 5α. Accordingly, grating 14a yields an increased deflection angle $5α_1$, and grating 14b yields an increased deflection angel $5α_2$.

Figure 4:
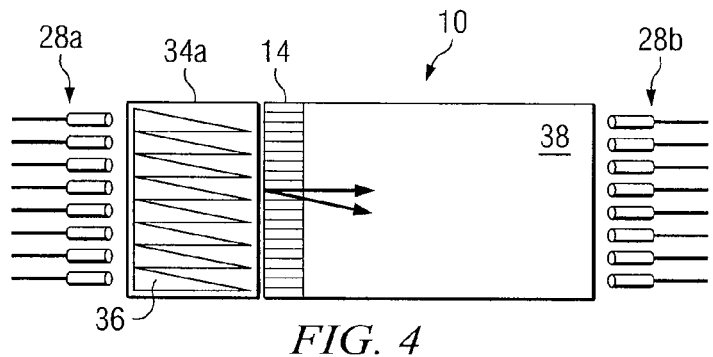
FIG. 4 illustrates an embodiment of a switch apparatus that includes electro-optic elements fabricated from bulk electro-optic materials.

FIG. 4 illustrates an embodiment of switch apparatus 10 that includes electro-optic elements fabricated from bulk electro-optic materials. In the illustrated embodiment, switch apparatus 10 includes input fiber collimators 28a, input electro-optic bulk detector 34a (with prism deflectors 36), Bragg grating 14, waveguide layer 38, and output fiber collimators 28b.

Figure 5A:
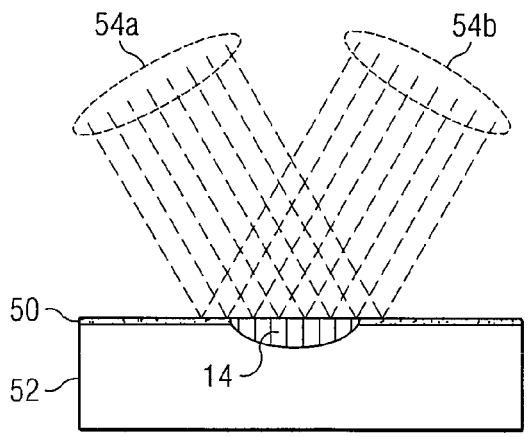
FIGS. 5A and 5B illustrate a method for forming a Bragg grating and a waveguide on a substrate.
Figure 5B:
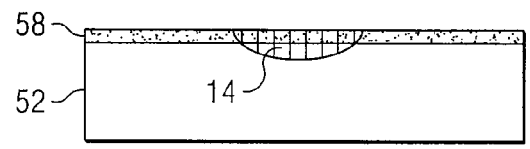

FIGS. 5A and 5B illustrate a method for forming a Bragg grating 14 and a waveguide 58 on substrate 52 to form slab waveguide 38. FIG. 5A illustrates formation of grating 14. Substrate 52 may comprise a photo-thermo-refractive (PTR) glass. Photo-thermo-refractive glass may be a sodium-zinc-aluminum silicate glass doped with silver, cerium, and/or fluorine.

A masking layer 50 is disposed outwardly from substrate 52. Masking layer 50 prevents exposure of areas of substrate 52 where grating 14 is not to be formed. The exposed area of substrate 52 is exposed by light beams 54a and 54b. Light beams 54a and 54b interfere at the exposed area. The interference pattern induces periodic changes in the refractive index of substrate 52. Light beams 54a and 54b may be generated by a Helium-Cadmium (He—Cd) laser operating at 325 nm, with dosages less than 1 Joule/centimeter (J/cm).

FIG. 5B illustrates formation of waveguide 58. Any suitable process may be used to form slab or channel waveguides in waveguide layer 50. Examples of processes includes an ion exchange process, an etching technique, or a deposition technique (such as a SOL-GEL technique).

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that a deflector switch has one or more Bragg gratings that increase the deflection angle of a light beam. A deflector of the deflector switch deflects a light beam at an initial deflection angle, and a Bragg grating further deflects the light beam to an increased deflection angle.

Another technical advantage of one embodiment may be that the deflector switch has Bragg gratings that react to different light beams. For example, one Bragg grating deflects light beams arriving at a particular incident angle, while another Bragg grating deflects light beams arriving at a different incident angle. As another example, one Bragg grating deflects light beams of one wavelength, while another Bragg grating deflects light beams of another wavelength.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. An apparatus for deflecting one or more light beams, comprising:
    an input deflector operable to:
        receive a plurality of light beams from a plurality of input channels; and
    the input deflector comprising a plurality of prism electrodes comprising:
        a first prism electrode configured to deflect a first light beam received from a first input channel to a first initial deflection angle; and
        a second prism electrode configured to deflect a second light beam received from a second input channel to a second initial deflection angle, the second light beam distinct from the first light beam, the second initial deflection angle different from the first initial deflection angle, the first input channel distinct from the second input channel; and
    one or more Bragg gratings, each Bragg grating optically coupled to the input deflector and operable to deflect at least one light beam from the initial deflection angle to an increased deflection angle, the increased deflection angle being at least closer to an output channel of one or more output channels than the initial deflection angle, the Bragg gratings comprising:
        a first Bragg grating operable to deflect the first light beam from the first initial deflection angle to a first increased deflection angle, and to pass through the second light beam without deflection; and
        a second Bragg grating operable to deflect the second light beam from the second initial deflection angle to a second increased deflection angle, the second initial deflection angle different from the first initial deflection angle, and to pass through the first light beam without deflection.

2. The apparatus of claim 1, wherein:
    a first Bragg grating is operable to:
        deflect the first light beam from the first initial deflection angle to a first increased deflection angle; and
    a second Bragg grating is operable to:
        deflect the second light beam from the second initial deflection angle to a second increased deflection angle, the second initial deflection angle different from the first initial deflection angle.

3. The apparatus of claim 1, further comprising an output deflector operable to:
    deflect the at least one light beam to the output channel of the one or more output channels.

4. The apparatus of claim 1, wherein the each Bragg grating further comprises:
    a substrate;
    a grating formed outwardly from the substrate; and
    a waveguide layer formed outwardly from the substrate.

5. The apparatus of claim 1, wherein the each Bragg grating further comprises:
    a substrate comprising a photo-thermo-reactive glass;
    a grating formed by irradiating the substrate; and
    a waveguide layer formed from the substrate by ion exchange.

6. The apparatus of claim 1, wherein the input deflector comprises an electro-optic thin film deflector.

7. The apparatus of claim 1, wherein the input deflector comprises an electro-optic bulk deflector.

8. The apparatus of claim 1, further comprising a waveguide optically coupled to the Bragg gratings and operable to:
    transmit the one or more light beams away from the one or more Bragg gratings.

9. The apparatus of claim 1, further comprising a waveguide optically coupled to the one or more Bragg gratings, the one or more Bragg gratings disposed within the waveguide.

10. The apparatus of claim 1, further comprising a waveguide optically coupled to the one or more Bragg gratings, the one or more Bragg gratings separate from the waveguide.

11. A method for deflecting one or more light beams, comprising:
    receiving, at an input deflector, a plurality of light beams from a plurality of input channels;
    deflecting, by a first prism electrode of the input deflector, a first light beam received from a first input channel to a first initial deflection angle;
    deflecting, by a second prism electrode of the input deflector, a second light beam received from a second input channel to a second initial deflection angle, the second light beam distinct from the first light beam, the second initial deflection angle different from the first initial deflection angle, the first input channel distinct from the second input channel;
    receiving the one or more light beams at one or more Bragg gratings; and deflecting, by each Bragg grating, at least one light beam from the initial deflection angle to an increased deflection angle, the increased deflection angle being at least closer to an output channel of one or more output channels than the initial deflection angle, the deflecting comprising:

deflecting, by a first Bragg grating, the first light beam from the first initial deflection angle to a first increased deflection angle, and passing through, by the first Bragg grating, the second light beam without deflection; and deflecting, by a second Bragg grating, the second light beam from the second initial deflection angle to a second increased deflection angle, the second initial deflection angle different from the first initial deflection angle, and to passing through, by the second Bragg grating, the first light beam without deflection.

12. The method of claim 11, wherein deflecting, by each Bragg grating, at least one light beam from the initial deflection angle to an increased deflection angle further comprises:

deflecting, by a first Bragg grating, the first light beam from the first initial deflection angle to a first increased deflection angle; and deflecting, by a second Bragg grating, the second light beam from the second initial deflection angle to a second increased deflection angle, the second initial deflection angle different from the first initial deflection angle.

13. The method of claim 11, further comprising:
deflecting the at least one light beam to the output channel of the one or more output channels.

14. The method of claim 11, wherein the each Bragg grating further comprises:
a substrate;
a grating formed outwardly from the substrate; and
a waveguide layer formed outwardly from the substrate.

15. The method of claim 11, wherein the each Bragg grating further comprises:
a substrate comprising a photo-thermo-reactive glass;
a grating formed by irradiating the substrate; and
a waveguide layer formed from the substrate by ion exchange.

16. The method of claim 11, wherein the input deflector comprises an electro-optic thin film deflector.

17. The method of claim 11, wherein the input deflector comprises an electro-optic bulk deflector.

18. The method of claim 11, further comprising transmitting, by a waveguide, the light beams away from the one or more Bragg gratings, the one or more Bragg gratings disposed within the waveguide.

19. The method of claim 11, further comprising transmitting, by a waveguide, the one or more light beams away from the one or more Bragg gratings, the one or more Bragg gratings separate from the waveguide.

20. An apparatus for deflecting one or more light beams, comprising:

means for receiving, at an input deflector, a plurality of light beams from a plurality of input channels;

means for deflecting, by a first prism electrode of the input deflector, a first light beam received from a first input channel to a first initial deflection angle;

means for deflecting, by a second prism electrode of the input deflector, a second light beam received from a second input channel to a second initial deflection angle, the second light beam distinct from the first light beam, the second initial deflection angle different from the first initial deflection angle, the first input channel distinct from the second input channel;

means for receiving the one or more light beams at one or more Bragg gratings; and means for deflecting, by each Bragg grating, at least one light beam from the initial deflection angle to an increased deflection angle, the increased deflection angle being at least closer to an output channel of one or more output channels than the initial deflection angle, the deflecting comprising:

deflecting, by a first Bragg grating, the first light beam from the first initial deflection angle to a first increased deflection angle, and passing through, by the first Bragg grating, the second light beam without deflection; and deflecting, by a second Bragg grating, the second light beam from the second initial deflection angle to a second increased deflection angle, the second initial deflection angle different from the first initial deflection angle, and to passing through, by the second Bragg grating, the first light beam without deflection.

* * * * *